(12) United States Patent
Fischer et al.

(10) Patent No.: US 12,322,897 B2
(45) Date of Patent: Jun. 3, 2025

(54) CABLE SEALING PLUG WITH LOCKING PART

(71) Applicant: TE Connectivity Germany GmbH, Bensheim (DE)

(72) Inventors: Carsten Fischer, Bensheim (DE); Roman Hildmann, Bensheim (DE); Maximilian Veihl, Bensheim (DE); Markus Eckel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/547,717

(22) Filed: Dec. 10, 2021

(65) Prior Publication Data

US 2022/0190510 A1 Jun. 16, 2022

(30) Foreign Application Priority Data

Dec. 10, 2020 (DE) .......................... 102020133029.4

(51) Int. Cl.
| | |
|---|---|
| *F16L 5/10* | (2006.01) |
| *H01R 13/52* | (2006.01) |
| *B29C 45/14* | (2006.01) |
| *G02B 6/38* | (2006.01) |

(52) U.S. Cl.
CPC ..... *H01R 13/5221* (2013.01); *H01R 13/5205* (2013.01); *B29C 45/14639* (2013.01); *F16L 5/10* (2013.01); *G02B 6/3879* (2013.01); *G02B 6/3893* (2013.01)

(58) Field of Classification Search
CPC .... F16L 5/10; H01R 13/5205; H01R 13/5221
See application file for complete search history.

(56) References Cited

U.S. PATENT DOCUMENTS

| | | | |
|---|---|---|---|
| 4,973,266 A | 11/1990 | Bullard | |
| 6,284,973 B1 * | 9/2001 | Daoud | H02G 3/083 |
| | | | 174/654 |
| 6,371,807 B1 | 4/2002 | Takagishi et al. | |
| 6,494,731 B1 | 12/2002 | Suzuki | |
| 6,957,970 B2 | 10/2005 | Weigel et al. | |

(Continued)

FOREIGN PATENT DOCUMENTS

| | | |
|---|---|---|
| CN | 1407666 A | 4/2003 |
| CN | 1853318 A | 10/2006 |

(Continued)

OTHER PUBLICATIONS

German Office Action, App No. 102020133029.4, dated Aug. 25, 2021, 7 pages.

(Continued)

*Primary Examiner* — Vanessa Girardi
(74) *Attorney, Agent, or Firm* — Barley Snyder

(57) ABSTRACT

A cable sealing plug includes a cable pass through opening extending through the cable sealing plug in an axial direction, a compression seal extending around the cable pass through opening, and a locking part having a locking system. The compression seal is transferable to a compressed state in which an inner diameter of the compression seal is smaller than a predetermined cable diameter of an electric cable extending through the cable pass through opening. The locking part and the compression seal are formed as a unitary component.

17 Claims, 2 Drawing Sheets

Fig. 1

(56) References Cited

U.S. PATENT DOCUMENTS

| | | | |
|---|---|---|---|
| 8,672,705 B2 | 3/2014 | Schneider | |
| 9,577,367 B2 | 2/2017 | Campbell et al. | |
| 10,141,686 B2* | 11/2018 | Martino | H01R 13/5845 |
| 10,177,495 B2 | 1/2019 | Dupeux et al. | |
| 10,903,599 B2* | 1/2021 | Lienert | H02G 15/046 |
| 2003/0148652 A1 | 8/2003 | Bernardi et al. | |
| 2004/0078926 A1 | 4/2004 | May et al. | |
| 2008/0233796 A1 | 9/2008 | Segrt | |
| 2015/0295346 A1 | 10/2015 | Campbell et al. | |
| 2019/0288464 A1 | 9/2019 | Annequin et al. | |
| 2020/0259291 A1 | 8/2020 | Lienert et al. | |

FOREIGN PATENT DOCUMENTS

| | | | |
|---|---|---|---|
| CN | 102195195 A | 9/2011 | |
| CN | 104979690 A | 10/2015 | |
| CN | 107589495 A | 1/2018 | |
| CN | 111133648 A | 5/2020 | |
| DE | 19834680 A1 | 2/2000 | |
| DE | 10029449 A1 | 2/2001 | |
| EP | 1396669 A2 | 3/2004 | |
| EP | 1396669 A3 | 3/2004 | |
| EP | 2930795 A1 | 10/2015 | |
| JP | 2000021491 A | 1/2000 | |
| JP | 2001015205 A | 1/2001 | |
| KR | 1020150117216 A | 10/2015 | |

OTHER PUBLICATIONS

Extended European Search Report dated May 3, 2022 corresponding to Application No. 21212900.1-1201, 12 pages.

Indian Examination Report dated Jun. 30, 202 corresponding to Application No. 202144056753, 6 pages.

Office Action from Japanese Patent Office dated Dec. 6, 2022, corresponding to Application No. 2021-198203 with English translation, 12 pages.

Korean Office Action dated Jul. 12, 2023 with English translation, corresponding to Application No. 10-2021-0175881, 15 pages.

Examination Report dated Jul. 21, 2023, corresponding to Application No. 21 212 900.1-1201, 9 pages.

Chinese First Office Action dated Mar. 28, 2024 with English translation, corresponding to Application No. 202111492368.0, 19 pages.

Chinese Office Action dated Sep. 23, 2024 with English translation, corresponding to App. No. 202111492368.0, 21 pages.

Toroid, Sep. 23, 2024, 2 pages, Wikipedia.

* cited by examiner

CABLE SEALING PLUG WITH LOCKING PART

CROSS-REFERENCE TO RELATED APPLICATIONS

This application claims the benefit of the filing date under 35 U.S.C. § 119(a)-(d) of German Patent Application No. 102020133029.4, filed on Dec. 10, 2020.

FIELD OF THE INVENTION

The present invention relates to a sealing plug and, more particularly, to a cable sealing plug for sealing a cable opening of an electric connector.

BACKGROUND

Electric cables are used in various applications from the low-voltage range to the high-voltage range for conducting current. With such an electric cable, power and/or information can be transmitted between two electric components. For connection of the electric cable to one of the electric components, the electric cable can be terminated in a housing of a connector. In order to prevent undesired media from entering the housing interior, which could cause a short circuit or contact failure, for example, the cable opening must be sealed. In the prior art, a sealing element is attached to the electric cable before it is inserted into the housing. However, moving the sealing element along the electric cable proves to be extremely laborious, particularly in the case of electric cables with large cable diameters, since the sealing element presses against the shell surface of the electric cable with a high sealing force in order to achieve the desired sealing effect.

SUMMARY

A cable sealing plug includes a cable pass through opening extending through the cable sealing plug in an axial direction, a compression seal extending around the cable pass through opening, and a locking part having a locking system. The compression seal is transferable to a compressed state in which an inner diameter of the compression seal is smaller than a predetermined cable diameter of an electric cable extending through the cable pass through opening. The locking part and the compression seal are formed as a unitary component.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
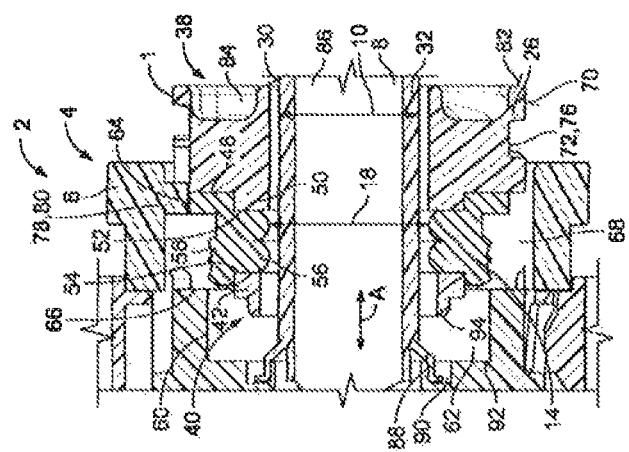
FIG. 2 is a sectional side view of a connector arrangement according to an embodiment including the cable sealing plug of FIG. 1 in a relaxed state.

The invention is exemplarily described in more detail below by way of embodiments. Features of the embodiments can be omitted if the technical effect associated with these features is not important for a particular application. Conversely, further features can also be added to the embodiments if their technical effect is important for a particular application. In the following, the same reference signs are used for features that correspond to each other in terms of function and/or spatial/physical configuration.

With reference to FIGS. 1 to 4, an exemplary configuration of a cable sealing plug 1 according to the invention, as well as a connector arrangement 2 comprising a connector 4 having a housing 6 provided with a cable opening 7, the cable sealing plug 1 and an electric cable 8 having a predetermined cable diameter 10 will be explained in more detail.

Figure 3:
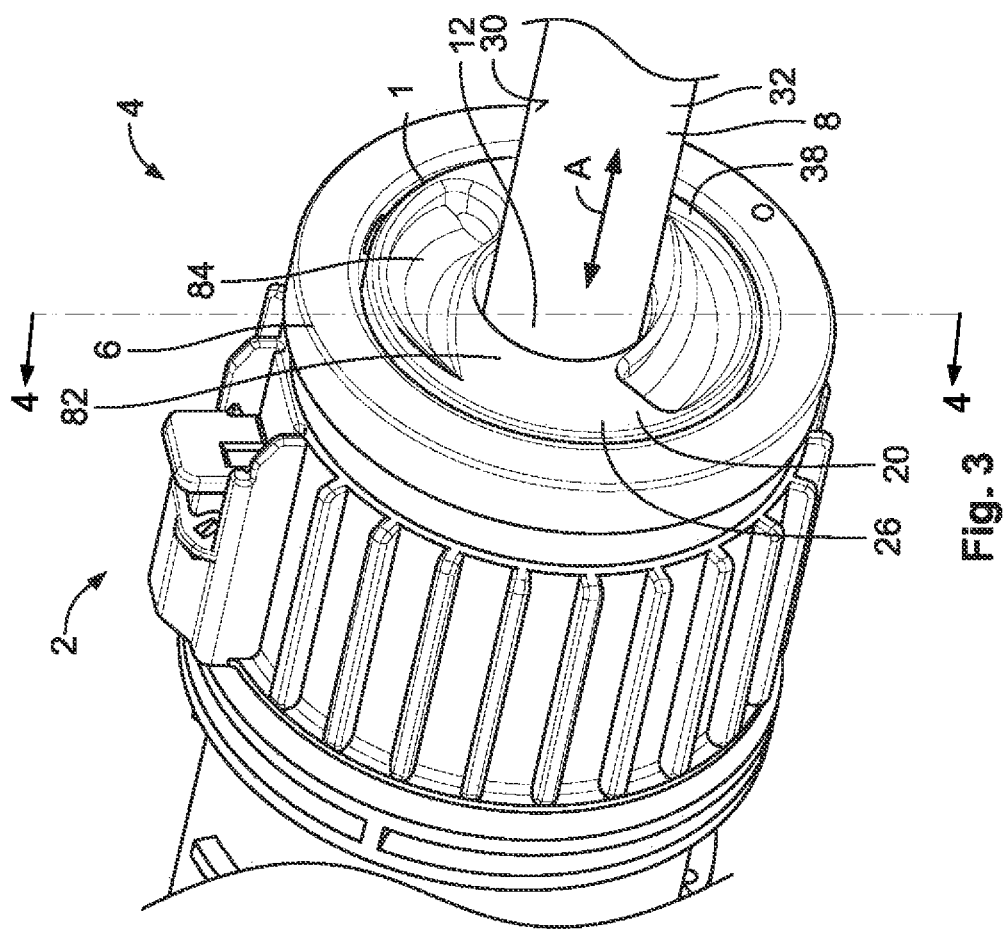
FIG. 3 is a perspective view of the connector arrangement of FIG. 2 in a blocking position.

The cable sealing plug 1 is penetrated in axial direction A by a cable pass through opening 12, through which the electric cable 8 can be inserted. The cable sealing plug 1 has a compression seal 14 extending around the cable pass through opening 12 and being transferable to a compressed state 16 (see FIG. 4) in which an inner diameter 18 of the compression seal 14 is smaller than the predetermined cable diameter 10, and a locking part 20 having a locking system 22 adapted to fix the cable sealing plug 1 to the connector 4 in a blocking position 24 as shown in FIGS. 3 and 4.

In order to prevent an unintentional displacement of the relative position of compression seal 14 and locking part 20 and to reduce the dependence of the sealing effect on the assembly skills of an assembling person, compression seal 14 and locking part 20 are united into one component 26 in an embodiment. This structural combination allows the contact surface between compression seal 14 and locking part 20 to be defined during manufacture. In the unitary component 26, the compression seal 14 and locking part 20 can be connected to each other in at least one direction in a movement-transmitting manner so that, for example, a rotary movement of the locking part 20 leads to a synchronous and simultaneous rotary movement of the compression seal 14. In particular, the compression seal 14 and locking part 20 can be connected to each other in all directions of movement in a movement-transmitting manner.

In a relaxed state 28, as shown in FIG. 2, the inner diameter 18 may in particular be larger than the predetermined cable diameter 10. As a result, the cable sealing plug 1 can be moved with ease in the axial direction A along the cable during assembly without creating static frictional forces between the compression seal 14 and the electric cable 8, which may cause damage to the compression seal 14. In the relaxed state 28, the compression seal 14 presses only with a low sealing force on the shell surface 30 of the cable 8 or is even spaced apart from it.

Figure 4:
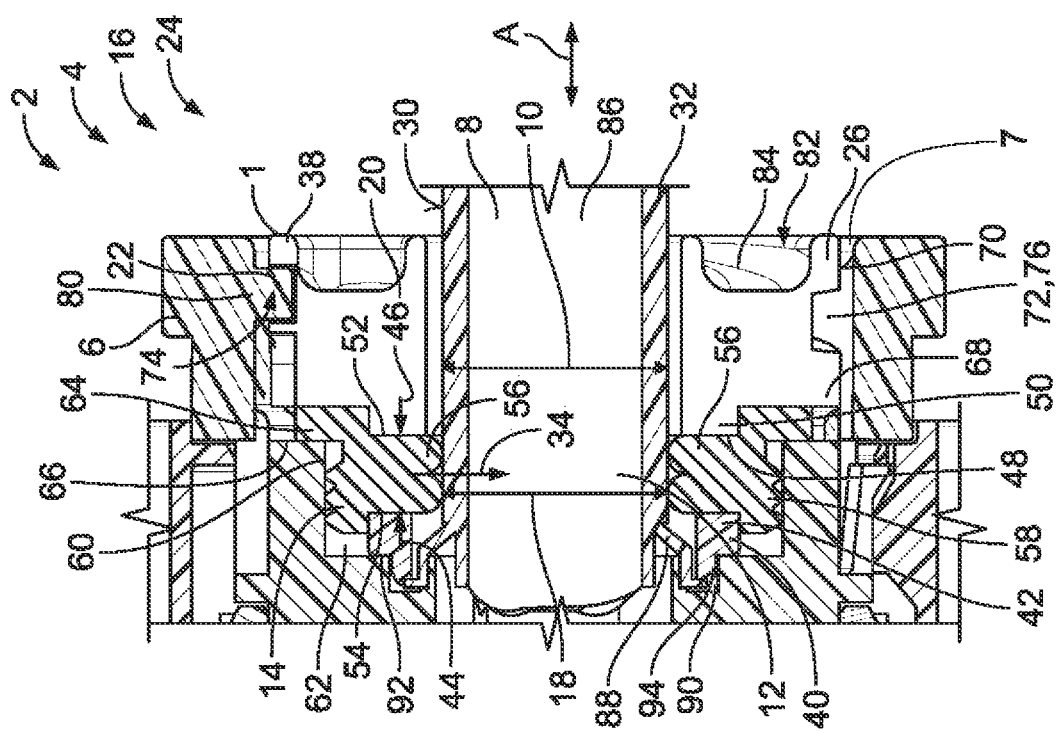
FIG. 4 is a sectional side view taken along line 4-4 of the connector arrangement of FIG. 3 according to an embodiment including the cable sealing plug of FIG. 1 in a compressed state.

If the compression seal 14 is now compressed or transferred to the compressed state 16 shown in FIG. 4, the compression seal 14 compresses in the axial direction A and the inner diameter 18 is reduced. Therefore, the compression seal 14 nestles against a shell surface 30 of the electric cable 8, which includes an insulation 32, and presses against this shell surface 30 with a high sealing force 34, compensating for changes in the cable diameter 10 and/or vibrations.

Because the cable sealing plug 1 is positioned along the electric cable 8 before the compression seal 14 is compressed, it is possible to configure the compression seal 14 such that a higher sealing force 34 is achieved compared to prior art solutions. Namely, if the sealing element was already pressing against the shell surface 30 of the electric cable 8 with the full sealing force when the cable sealing plug 1 was positioned, the sealing force would have to be low enough to allow the cable sealing plug 1 to be displaced along the cable 8. Consequently, by using the cable sealing plug 1, not only the assembly can be facilitated, but also the sealing effect can be improved. With the higher sealing force 34, the vibration resistance is also increased, since the compression seal 14 dampens the occurring vibrations.

In the unitary component 26, the compression seal 14 and the locking part 20 may, in particular, be non-detachably connected to one another, for example by a material closure. Thus, the unitary component 26 may be an injection-molded part that has been produced, for example, by a multicomponent injection molding process. A multi-component injection molding process is particularly suitable if the locking part 20 and the compression seal 14 are to be made of different materials. For example, the compression seal 14 can be molded from an elastic or even rubber-elastic material and the locking part 20 from a comparatively stiffer material. The locking part 20 can withstand high mechanical loads, such as impact and/or shock loads and can, for example, be formed from a metal. In another embodiment, however, the locking part 20 is formed from a plastic, for example a thermoplastic.

The configuration of the locking part 20 and the compression seal 14 as a unitary component 26 prevents any unwanted displacement of the relative position between the compression seal 14 and the locking part 20, especially in the radial direction. Therefore, a contact surface between the compression seal 14 and the locking part 20 can be already precisely determined during manufacture and not only during assembly. Displacement of the contact surface is avoided, allowing an optimized configuration of the compression seal 14, since the deformation of the compression seal 14 in the compressed state, in particular the direction of the displacement, can be predefined. With a material closure, a resilient connection can be achieved between the compression seal 14 and the locking part 20, which can prevent the compression seal 14 from suddenly falling off or tearing away from the locking part 20.

If the compression seal 14 was not structurally united with the locking part 20, this compression seal 14 would have to be positioned precisely in the housing 6 before the locking part 20 presses against the compression seal 14 and transfers it to the compressed state 16. The positioning of the compression seal 14 alone would require a lot of sensitivity, and the position of the compression seal 14 could be displaced by simple vibrations, for example by the movement of the locking part 20. The compression of the compression seal 14 and the resulting sealing effect would thus depend on the skills of the person assembling it.

With the configuration according to the invention as a unitary component 26 of the cable sealing plug 1, the relative position between the compression seal 14 and the locking part 20 is already predetermined and the compression seal 14 can simply be inserted into the housing 6 in one step with the locking part 20. Thus, the sealing effect of the cable sealing plug 1 is independent of the skills of the person assembling it.

When inserted into the cable opening 7, a compression ring 42 strikes a housing wall 60 and presses against the compression seal 14 with a pressing force 44 distributed evenly along the compression ring 42. On the opposite side, the locking part 20 presses against the compression seal 14 so that the compression seal 14 is axially compressed and the displaced material of the compression seal 14 escapes radially inwards or outwards.

Figure 1:
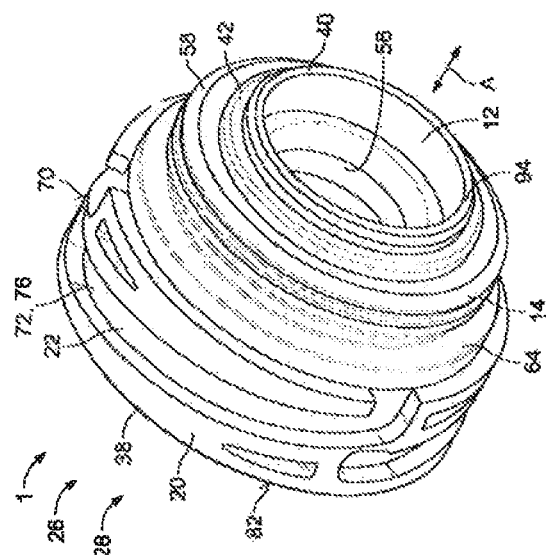
FIG. 1 is a perspective view of a cable sealing plug according to an embodiment.

The locking part 20 may form an axial end 38 of the cable sealing plug 1. As shown in FIGS. 1, 2, and 4, an axial end 40 of the cable sealing plug 1 opposite the axial end 38 may be formed by a compression ring 42. The compression ring 42 may abut a side of the compression seal 14 remote from the locking part 20, and allows a uniform compression force to be applied to the compression seal 14. The compression seal 14 can be located directly between the locking part 20 and the compression ring 42. A pressing force 44 may be applied to the compression seal 14 via the compression ring 42, and the pressing force 44 may be directed opposite to a pressing force 46 of the locking part 20. Consequently, the compression seal 14 can be compressed uniformly in axial direction A, as schematically indicated in FIG. 4.

The compression ring 42 can be formed from an electrically conductive material, whereby the compression ring 42 also serves as a shielding element in the connector arrangement 2. In an embodiment, the compression ring 42 can be configured as a separate component that can be detachably connected to the compression seal 14, for example via a form-fit connection. Here, detachably means that the compression seal 14 and the locking part 20 or the compression ring 42 can be separated from each other without damaging one of the components. In an embodiment, in order to improve the connection between the compression seal 14 and the locking part 20, a form-fit connection can be formed between the compression seal 14 and the locking part 20 in addition to the material closure, for example in the form of a tongue-and-groove connection.

Alternatively, the compression ring 42 may be formed of an electrically insulating material. In this configuration, the housing 6 can be formed from an electrically conductive material so that the housing 6 serves as a shielding element and the compression ring 42 secures the shield contact between the housing 6 and the cable shielding 88.

In an embodiment, the compression ring 42 may be part of the unitary component 26 as shown in the exemplary configuration. For example, the compression ring 42 may be formed as a component of a multi-component injection molded part and may be non-detachably coupled to the compression seal 14. Thus, in particular, the compression ring 42 may be formed from the same material as the locking part 20.

As shown in FIGS. 2 and 4, there can be at least one projecting shoulder 50 on a surface 48 where the locking part 20 and the compression seal 14 are connected to one another. In this exemplary configuration, the shoulder 50 is formed on the locking part 20 and it projects into the compression seal 14 in the axial direction A. Thereby, the shoulder 50 forms a pressing surface 52 via which the pressing force 46 acts on the compression seal 14.

At the end of the compression seal 14 facing away from the locking part 20, the compression ring 42 can be received at least in sections in the axial direction A in the compression seal 14, wherein a pressing surface 54 is also formed here which is directly opposite the pressing surface 52 with respect to the compression seal 14. Consequently, the compression seal 14 can extend directly between the pressing surfaces 52, 54 in axial direction A and it can be ensured that the pressing forces 44, 46 are arranged essentially parallel or antiparallel to one another.

In a particularly compact cable sealing plug 1, an outer diameter of the cable sealing plug 1 may decrease in the direction from the locking part 20 toward the compression seal 14. For example, the locking part 20 may have an outer diameter that is larger than the outer diameter of the compression seal 14. If a compression ring 42 is present, its outer diameter may in particular be smaller than the outer diameter of the compression seal 14.

As can be seen in the exemplary configuration, the compression seal 14 may include a radially inwardly projecting pressure bead 56 located directly between the pressing surfaces 52, 54 in the axial direction A. The inwardly projecting pressure bead 56 represents the part of the compression seal 14 which surrounds the cable pass through opening 12 and which, in the compressed state 16, is compressed in the axial direction A and thereby expands in the radial direction. According to FIG. 4, the radially inwardly projecting pressure bead 56 in the connector arrangement 2 presses against the shell surface 30 of the electric cable 8 in the compressed state 16 and prevents fluids from entering the area between the cable 8 and the cable sealing plug 1 in the axial direction A.

In addition, the compression seal 14 may have a radially outwardly projecting pressure bead 58 which, at least in the compressed state 16 shown in FIG. 4, is pressed against an inner wall 60 of the housing 6 delimiting the cable opening 7 in the radial direction and thus seals off an area between the housing 6 and the cable sealing plug 1. For this purpose, the housing 6 can have a sealing receptacle 62 in which at least the radially outwardly projecting pressure bead 58 is arranged in the blocking position 24.

In the relaxed, non-compressed state 28, the radially outwardly projecting pressure bead 58 can have an outer diameter that is smaller than the inner diameter of a seal receptacle 62, so that when the compression seal 14 is inserted into the seal receptacle 62, the compression seal 14 does not get caught on the inner wall that delimits the seal receptacle 62 in the radial direction. Another advantage of the radially outwardly protruding pressure bead 58 is that a single compression seal 14 seals not only the area between the electric cable 8 and the cable sealing plug 1, but also the area between the cable sealing plug 1 and the housing 6, which enables a particularly compact design.

The outwardly projecting pressure bead 58 can overlap at least in sections in the radial direction with the inwardly projecting pressure bead 56 and/or the compression ring 42 so that the radially outwardly projecting pressure bead 58 can be supported by the compression ring 42 and/or the inwardly projecting pressure bead 56.

The pressure bead 56, 58 can, for example, have at least one sealing lip that presses against the shell surface 30 of the cable 8 in the compressed state 16. In an embodiment, the pressure bead 56, 58 can have several sealing lips arranged next to each other in the axial direction so that, in the compressed state 16, the pressure bead 56, 58 presses against the shell surface 30 of the cable 8 or against the inner wall of the housing 6 at several points spaced apart from each other in the axial direction.

If fluids are to be prevented from entering the sealing receptacle 62, the compression seal 14 may, in an optional configuration, have a radially protruding collar 64 which, in the blocking position 24, is pressed in the axial direction A against a transition 66 between a blocking region 68 adapted to receive the locking part 20 and the sealing receptacle 62. In an embodiment, the collar 64 may overlap with the shoulder 50 in the radial direction so that the collar 64 is protected against being pushed in in the radial direction.

In order to keep the cable sealing plug 1 as compact as possible, a shell surface 70 is formed at least in sections by the locking part 20 and the compression seal 14, as shown in FIGS. 1, 2, and 4. This allows the shell surface 70 to be used for the specific tasks of the compression seal 14 or the locking part 20. As previously described, a seal between the cable sealing plug 1 and the housing 6 can be realized via the compression seal 14, whereby a further, separate sealing element intended for this task can be dispensed with. In the case of the locking part 20, in an embodiment, the locking system 22 is located on the part of the shell surface 70 formed by the locking part 20. If the cable sealing plug 1 has a compression ring 42, the compression ring 42 can also form a section of the shell surface 60.

For smaller cable diameters 10, a very large sealing force is not required. Therefore, in such applications, it is possible for the locking system 22 and complementary locking system 78 to engage with each other by a latching and/or snapping mechanism. For example, the locking system 22 can have at least one latching tab that engages the complementary locking system 78 in the blocking position 24.

Electric cables 8 with high predetermined cable diameters 10 may require high sealing forces which make it difficult to transfer the compression seal 14 to the compressed state 16. To facilitate assembly of the cable sealing plug 1, the locking part 20 may be provided with a sliding guide 72, shown in FIGS. 2 and 4, via which the rotational movement of the locking part 20 is converted into an axial movement of the cable sealing plug 1.

This can be realized, for example, by a screw connection which, however, has the disadvantage that the blocking position 24 cannot be defined exactly, since the final screw position depends on the person assembling it. An exact definition of the blocking position 24 can be achieved, for example, with a bayonet lock 74 shown in FIG. 4, in which latching only takes place in the blocking position 24. For this purpose, the sliding guide 72 can be adapted as a bayonet guide 76 and the complementary locking system 78 as a radially projecting slide block 80 shown in FIGS. 2 and 4, which is arranged in the blocking region 68 of the cable opening 7. For uniform stress on the locking part, a plurality of bayonet guides 76 spaced apart in the circumferential direction may be provided to simultaneously receive and lock with a respective slide block 80 in the blocking position 24. In the blocking position 24, a constant pressing force 46 can be generated by the locking part 20 over the period of use without the locking part 20 being pressed out of the housing 6.

The seal receptacle 62 can be adjacent in the axial direction to a blocking area of the cable opening 12 provided with the complementary locking system 78, wherein the blocking area has an inner diameter that is larger than an inner diameter of the seal receptacle 62.

For better handling of the cable sealing plug 1, the locking part 20 can be provided with at least one handling area 84 on its end face 82 facing away from the compression seal 14, as shown in FIGS. 2 and 3. This handling area 84 can be configured to facilitate engagement by hand or a tool and, in this exemplary configuration, is configured as a depression. The handling area 84 can alternatively be configured as an elevation.

The handling area 84 may also serve to provide directional guidance and may increase along a blocking direction in an axial and/or radial direction. The handling area 84 can also serve for orientation and, for example, signal the locking direction by increasing the handling area 84 circumferentially along the locking direction in the axial and/or radial direction. This has the further advantage that locking is facilitated, however accidental unlocking can be avoided. In the opposite direction to the locking direction, the area of the handling area 84 is smaller, which means that, for example, the impact of an external object on the handling area 84 has no or at least little effect on the rotational position of the cable seal plug.

The electric cable 8 can have at least one electric conductor 86 sheathed with an insulation 32 or also a conductor bundle, as shown in FIG. 4. A cable shielding 88 can be arranged between insulation 32 and electric conductor 86, which is exposed for shield contacting of the connector 4 and is inserted into an annular pocket 90.

As shown in FIGS. 2 and 4, the annular pocket 90 can be arranged radially inwards on an inner wall 92 delimiting the cable opening 7 in the axial direction, which facilitates insertion of the exposed part of the cable shielding 88. The annular pocket 90 may, for example, contain a shielding plate or the inner wall 92 of the housing may be configured as a shielding element. For improving the vibration resistance of the shield contact, the compression ring 42 may have an extension 94 projecting in the axial direction A away from the compression seal 14 and projecting into the annular pocket 90 at least in the blocking position 24 to press the cable shielding 88 against the housing 6. Consequently, the extension 94 improves the vibration resistance of a shield contact. In another embodiment, at least the extension 94 or even the entire compression ring can serve as a shielding element and be formed from an electrically conductive material.

In FIG. 4, it is shown that in the blocking position 24, the compression seal 14 is in the compressed state, which allows the compression of the compression seal 14 to be maintained at a constant level. In this case, the compression ring 42 is supported against the inner wall 92 and presses against the compression seal 14 with the pressing force 44 essentially parallel to the axial direction A.

In FIG. 4, the entire cable sealing plug 1 is located in the blocking position 24 in the housing 6. Thus, the cable sealing plug 1 does not protrude from the cable opening 7, which does not increase the dimensions of the connector 4 in the axial direction. In particular, the cable sealing plug 1 can terminate with one end of the housing 6, so that it is unnecessary to reach into the cable opening 7 to actuate the cable sealing plug 1.

What is claimed is:

1. A cable sealing plug, comprising:
   a continuous cylindrical cable pass through opening having a diameter greater than a cable diameter of an electric cable extending through the cable pass through opening, and extending through the cable sealing plug in an axial direction;
   a toroidal compression seal extending continuously around the cable pass through opening, the compression seal is configured to move in the axial direction and radially perpendicularly toward the center of the cable pass through opening from an uncompressed state in which an inner diameter of the compression seal is larger than the cable diameter to a compressed state in which an inner diameter of the compression seal is smaller than the cable diameter; and
   an annular locking part extending continuously around the cable pass through opening and having a contact surface disposed adjacent the compression seal, wherein the locking part and the compression seal are a unitary component and move together in the axial direction when a sliding guide extending circumferentially around and formed in a surface of the locking part and a bayonet guide formed in a connector housing with which the annular locking part engages are rotated relative to each other around a common axis to move the annual locking part axially relative to the connector housing to compress the compression seal against the contact surface as a result of the compression seal being displaced radially as a result of the rotation.

2. The cable sealing plug of claim 1, wherein the locking part has a handling area on an end face facing away from the compression seal.

3. The cable sealing plug of claim 1, wherein the locking part and the compression seal are a single injection molded component.

4. The cable sealing plug of claim 1, further comprising a bayonet lock.

5. A cable sealing plug, comprising:
   a cylindrical cable pass through opening extending through the cable sealing plug in an axial direction;
   a toroidal compression seal extending around the entire cable pass through opening; and
   an annular locking part extending entirely around the cable pass through opening and having a continuous contact surface disposed adjacent the compression seal including an axially projecting shoulder contacting the compression seal, wherein the annular locking part and the compression seal are formed as a unitary component,
   wherein the compression seal and the annular locking part move together in the axial direction to compress the compression seal when a sliding guide is rotated relative to a bayonet guide that engages the sliding guide, the bayonet guide extending circumferentially around and formed in a surface of a connector, whereby the annular locking part engages the bayonet guide when rotated, whereby an inner diameter of the compression seal moves radially perpendicularly toward the center of the cable pass through opening from being larger than a cable diameter of an electric cable extending through the cable pass through opening to being smaller than the cable diameter when the annular locking part is rotated.

6. The cable sealing plug of claim 5, wherein the locking part and the compression seal are a single injection molded component having a generally cylindrical cross-section.

7. The cable sealing plug of claim 5, further comprising a bayonet lock.

8. The cable sealing plug of claim 5, wherein the sliding guide extends about the shell surface in a circumferential direction and an axial direction.

9. The cable sealing plug of claim 5, wherein the compression seal has a radially projecting pressure bead on an outer side and/or an inner side of the compression seal.

10. The cable sealing plug of claim 9, wherein the radially projecting pressure bead is a radially inwardly projecting pressure bead abutting directly against the locking part in the axial direction.

11. The cable sealing plug of claim 5, wherein the locking part has a handling area on an end face facing away from the compression seal.

12. The cable sealing plug of claim 11, wherein the handling area increases axially and/or radially along a circumferential direction.

13. The cable sealing plug of claim 5, further comprising a compression ring arranged at an axial end of the cable sealing plug opposite the locking part.

14. The cable sealing plug of claim 13, wherein the compression seal is located between the locking part and the compression ring.

15. The cable sealing plug of claim 13, wherein the compression ring is formed of an electrically conductive material.

16. The cable sealing plug of claim 13, wherein the unitary component includes the compression seal, the locking part, and the compression ring.

17. The cable sealing plug of claim 13, wherein the compression ring has an extension projecting away from the compression seal in the axial direction.

\* \* \* \* \*